United States Patent Office 3,507,807
Patented Apr. 21, 1970

3,507,807
CORROSION INHIBITING COMPOSITION CONTAINING A POTASSIUM SOAP OF TALL OIL, TOLUENE, ALKALI METAL PHOSPHATE, AND ALKALI METAL SILICATE
Taito Herman Rikhard Palikko, Kilo, Finland
No Drawing. Filed Dec. 12, 1966, Ser. No. 600,770
Int. Cl. A61l *23/00;* C09k *3/00;* C23f *11/00*
U.S. Cl. 252—389        3 Claims

ABSTRACT OF THE DISCLOSURE

A composition useful, for example, for preventing rust comprising a colloidal solution of 30-50% by weight of potassium soap of tall oil, 5-20% by weight of toluene, 1-5% by weight of condensed alkali metal phosphate, 1-5% by weight of alkali metal silicate, and the balance water.

This invention relates to a composition which may be used very effectively for several different purposes.

One of the objects of the invention is to provide a composition, which effectively inhibits the growth of bacteria and parasitic fungi.

Another object of the present invention is to provide a composition, which may be used in the treatment of burns, and another object is to produce a composition, which prevents rust.

Still another object of the invention is to provide a composition, which can be used in the treatment of plant diseases.

Further it is the object of the present invention to provide a composition, which can be used as a disinfectant.

The composition according to the invention may generally be used as a disinfectant for disinfecting both skin and instruments (for example in the hospital).

The composition according to the invention has proved to be specifically effective in treating the diseases caused by parasitic fungi.

Furthermore the composition, in accordance with the invention, has been found exceedingly effective for the treatment of burns.

Surprisingly enough the composition according to the invention has also been found to be a very effective rust preventive.

The composition according to the invention comprises toluene, a potassium soap of tall oil and water.

Preferably the present invention provides a composition for inhibiting the growth of bacteria and parasitic fungi and for treating burns, comprising by weight 30% to 55% of potassium soap of tall oil, 10% to 30% of toluene, and the balance of water.

In a preferred embodiment the present invention provides a composition for inhibiting the growth of bacteria and parasitic fungi and for treating burns, comprising by weight 40% of potassium soap of tall oil, 20% of toluene, 2.5% sodium hexametaphosphate, 0.05% usnic acid, and 37.45% water.

The composition according to the invention for preventing rust comprises water, potassium soap of tall oil and a solution containing hydrocarbon solvent, in which the phosphates and silicates are dissolved.

Both humans and plants are subject to attacks by parasitic fungi which, in humans, cause inter alia "athlete's foot" and ringworm of the body ("dhobie's itch"). Illustrative examples of diseases caused by parasitic fungi in plants are wheat mildew (*Erysiphe graminis*), rose mildew (*Sphaerotheca pannosa*), begonia mildew (*Oidium begoniae*), pea mildew (*Peronospora viceae* or *P. trifoliorum*), and gooseberry rust (*Septoria ribis*).

Toluene by itself has a specific cleansing and disinfectant effect. However, the problem which has to be solved in this connection is to obtain a solution of toluene in water. By admixture of a potassium soap of tall oil the inventor has been able to provide a colloidal solution of toluene and water, said colloidal solution being quite clear and transparent and giving a faint Tyndall beam. When the amount of toluene is comparatively high, the composition is turbid. However, the emulsifying effect of the potassium soap used in this case is so great that the composition will not "break." The toluene solution obtained may be diluted with water to any desired degree, said solution still remaining quite clear.

Water softening and/or surface active agents may be used as additive to increase the effect of the composition.

A suitable water softening agent is sodium hexametaphosphate. The amount of water softening agent used in the present invention is dependent upon the degree of hardness of the water used and can be easily calculated by a person skilled in the art. If distilled water, rain water or otherwise adequately soft water is used the use of said water softening agent is superfluous.

The addition of surface active agents to the composition will increase for example its fungicidal effect, since it will then become capable of penetrating deeper into the very bottom of the mycelium. Suitable surface active agents are, for example alkyl aryl sulphonates, aryl sulphonates, aliphatic sulphonates, e.g. lauryl sulphonates, and sulphonates of animal origin.

The ratio by weight of the sum of the fatty acid and resin acid equivalent contained in the potassium soap of tall oil to the toluene is preferably 1:1 to 1:5. The usnic acid which is difficult to dissolve in water is sufficiently soluble in toluene. An effective bactericidal concentration of usnic acid in toluene is as low as ½ of one thousandth part by weight.

The following specific details of the invention are given by way of example only in order to make the invention more easily comprehensible.

The following test for determining the effectiveness of the composition as a fungicide were made with a mixture containing, by weight,

| | Percent |
|---|---|
| Potassium soap of tall oil | 40 |
| Toluene | 20 |
| Sodium hexametaphosphate | 2.5 |
| Usnic acid | 0.05 |
| Water | 37.45 |

Begonias diseased by *Oidium begoniae* to the degree that it has been decided to turn the plants were treated with a water solution containing 1% of the aforestated composition. Treatment was given by washing the plants once a week. The mildew disappeared entirely within 1.5 months of treatment and the plants were quite healthy. New shoots developed abundantly. These results are quite surprising in that the composition of the invention has a specific effect, being toxic to mildew but noninjurious to plant life.

The same 1% solution was used for treating rose mildew (*Spaerotheca pannosa*) in a similar manner, and the same good results were obtained.

The advantage of the composition according to the invention is that it is nonpoisonous to human and plant growth and therefore suitable for all treatments thereof without danger.

The effectiveness of the composition of the invention on bacteria was also tested by using *Escherichia coli* species as test bacteria. A composition comprising the following ingredients by weight was made up:

| | Percent |
|---|---|
| Potassium soap of distilled tall oil | 40 |
| Toluene (of so called naphtha-kind) | 11.5 |
| Sodium hexametaphosphate | 0.4 |
| Water | 46.5 |

Tests showed that the above composition according to the invention diluted 11 times with water had the same bactericidal effect as phenol diluted 25 times with water; hence the phenol coefficient of the composition is 0.44.

A patient afflicted with "athlete's foot" to the degree that fungus growth under the big toe nail rendered the wearing of a shoe impossible was treated with the composition of the invention. Also, other areas of the feet were affected with thick fungus growths. The sore feet were daily soaked for a 10-minute period in an aqueous solution containing 30% of the second composition given in the example. After four days of treatment the fungus which had caused athlete's foot disappeared. The compositions of matter heretofore used for treating the said skin complaint contain ingredients such as salicyclic acid, benzoic acid, chlorbutol, chlorcresol methylsalicylate, zinc undecylenate and zinc naphthenate, and are capable of clearing up the infection only after treatment of at least several weeks duration.

The composition according to the invention is also useful for treating other skin disorder due to fungus infection.

It is apparent that the composition according to the present invention is effective in the treatment of both human skin disorders and plant diseases. The anomaly may be explained by assuming that these disorders and diseases are caused by related parasitic fungi.

The composition in accordance with the invention has also been found to be exceedingly effective in treating burns. In this application the following points are of great importance:

quick alleviation of pain,
prevention of blisters,
easy treatment, cheap medicament,
quick and definite improvement.

The prevention of bacterial infection in the wounded tissue is of greatest importance. The composition according to the invention kills immediately the bacteria infecting the skin tissues and generates a protective film on the skin. The toluene and the water when evaporating derive their heat of evaporation from the skin causing the pains to cease immediately. The percolation of the tissue fluid in the blood ceases under the protective coating and the formation of blisters is precluded, so that granulation may being at an early stage. It is stated that sound skin begins to grow under the injured skin within a few hours after the burn in the case of immediate use of the composition (e.g. in 3–5 minutes). Thus the skin has been able to recover completely in 2–3 days. Soreness to touch ceases in two hours. Compresses are not needed, but a band to protect the skin coating from rupture is beneficial. The composition for burns according to the invention has been examined at the Hygienic Institute of Turun Yliopisto University, and the information in this paragraph derived from the results of the examination.

Due to its disinfectant and cleansing effect the composition according to the invention may suitably be used as a cleaning and disinfecting agent for the skin and instruments.

On the basis of recent examinations it has been found, surprisingly enough, that potassium soap, which has been made of tall oil containing resin acids, is capable of emulsifying hydrocarbon solvents together with water, phosphates and silicates into such a clear, stable, colloidal solution, which on the surface of steel forms a coating, after the solvent and water have evaporated, which protects the steel effectively against rust caused by changes in the climate.

The principal characteristic of the rust-preventive according to the present invention is consequently that it comprises a composition of water, potassium soap made of tall oil and a hydrocarbon solvent, in which the phosphates and silicates are dissolved.

The use of potassium soap and hydrocarbon solvent is one of the primary conditions for obtaining a clear composition, which contains water as well as silicates and phosphates in the solution. On the basis of experiments such a composition has been found preferable, which contains about 30–50% of such potassium soap made of tall oil, as has a total fat and resin acid content of approximately 40%, hydrocarbon solvent 5–20%, condensed phosphates (e.g. sodium polyphosphate, tetrasodium pyrophosphate and sodium hexametaphosphate) 1–5%, silicates as technical products (e.g. sodium metasilicates+5H$_2$O) 1–5%, and the rest water. The above quantities denote percentages by weight. They may also be expressed as percentages by weight of the dry substance.

In order to visualize the invention and example is given below of the preparation of the rust preventive according to the present invention.

Example:

The following quantities are mixed as weight parts

| | Parts |
|---|---|
| Potassium soap made of tall oil, the total fat and resin acid content being 40% | 40 |
| Toluene | 15 |
| Condensed phosphates | 3 |
| Sodium metasilicate with 5H$_2$O | 2 |
| Water | 40 |

The mixture is stirred, until it becomes clear, and the liquid thus obtained can be used as such or in diluted form depending on the circumstances.

The protected objects should naturally be kept in a covered place, which is protected from direct rain. On the other hand changes in the climate and temperature will not affect the surfaces thus protected. If necessary the rust preventive can be removed by rinsing with water.

ASEA in Sweden has tried the rust preventive according to the present invention and has approved it for use in atomic reactors.

What I claim is:

1. A composition for preventing rust consisting essentially of 30–50% by weight of potassium soap of tall oil, 5–20% by weight of toluene, 1–5% by weight of condensed alkali metal phosphate, 1–5% by weight of alkali metal metasilicate, and the balance water.

2. A composition according to claim 1, wherein said potassium soap of tall oil has a total fat and resin acid content of approximately 40% by weight.

3. A composition for preventing rust consisting essentially of about 40 parts by weight of potassium soap of tall oil, about 15 parts by weight of toluene, about 3 parts by weight of condensed alkali metal phosphates, about 2 parts by weight of alkali metal metasilicate, and about 40 parts by weight of water.

References Cited

UNITED STATES PATENTS

| 2,785,089 | 3/1957 | Lantori | 117—134 |
| 3,078,223 | 2/1963 | Thompson | 252—392 |

MAYER WEINBLATT, Primary Examiner

I. GLUCK, Assistant Examiner

U.S. Cl. X.R.

21—2.5; 106—14; 117—134; 252—147, 392, 396